(12) United States Patent
Latheef et al.

(10) Patent No.: US 12,490,336 B2
(45) Date of Patent: Dec. 2, 2025

(54) METHODS AND SYSTEMS FOR MANAGING MBS SERVICE CONTINUITY FOR A UE

(71) Applicant: Samsung Electronics Co., Ltd., Suwon-si (KR)

(72) Inventors: Fasil Abdul Latheef, Bangalore (IN); Vinay Kumar Shrivastava, Bangalore (IN); Sriganesh Rajendran, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 382 days.

(21) Appl. No.: 18/019,971

(22) PCT Filed: Aug. 6, 2021

(86) PCT No.: PCT/KR2021/010443
§ 371 (c)(1),
(2) Date: Feb. 6, 2023

(87) PCT Pub. No.: WO2022/031127
PCT Pub. Date: Feb. 10, 2022

(65) Prior Publication Data
US 2023/0300938 A1 Sep. 21, 2023

(30) Foreign Application Priority Data

Aug. 6, 2020 (IN) .............................. 202041033739
Jul. 26, 2021 (IN) ............................. 2020 41033739

(51) Int. Cl.
H04W 76/27 (2018.01)
H04W 76/15 (2018.01)

(52) U.S. Cl.
CPC ........... *H04W 76/27* (2018.02); *H04W 76/15* (2018.02)

(58) Field of Classification Search
CPC ..... H04W 76/27; H04W 76/15; H04W 76/34; H04W 76/40; H04W 4/06
See application file for complete search history.

(56) References Cited

U.S. PATENT DOCUMENTS

2012/0095919 A1   4/2012  Hart et al.
2016/0353308 A1  12/2016  Kim et al.
(Continued)

FOREIGN PATENT DOCUMENTS

EP    2367395 A1   9/2011
EP    4152781 A1   3/2023
(Continued)

OTHER PUBLICATIONS

Extended European Search Report dated Dec. 13, 2023, issued in European Patent Application No. 21853466.7.
(Continued)

*Primary Examiner* — Farid Seyedvosoghi
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Embodiments herein disclose methods and systems to achieve inter RRC state and inter cell service continuity in NR MBS by addressing procedures and signalling for achieving service continuity upon state change and upon cell change in scenarios such as, but not limited to, RRC connection release, RRC cell reselection, and so on.

10 Claims, 13 Drawing Sheets

(56) References Cited

U.S. PATENT DOCUMENTS

| | | | |
|---|---|---|---|
| 2019/0166580 A1 | 5/2019 | Prasad et al. | |
| 2019/0380078 A1* | 12/2019 | Fujishiro | H04W 48/20 |
| 2020/0260308 A1* | 8/2020 | Jin | H04B 17/318 |
| 2023/0057553 A1* | 2/2023 | Hayes | A61F 2/2418 |
| 2023/0232189 A1* | 7/2023 | Kim | H04W 4/06 |
| | | | 370/312 |

FOREIGN PATENT DOCUMENTS

| | | |
|---|---|---|
| WO | 2001/060013 A1 | 8/2001 |
| WO | 2021-081550 A1 | 2/2023 |

OTHER PUBLICATIONS

'3GPP; TSG SA; Study on architectural enhancements for 5G multicast-broadcast services (Release 17)', 3GPP TR 23.757 V0.4.0, Jun. 22, 2020.

ZTE et al., 'Discussion on the scope of NR MBS', RP-200818, 3GPP TSG RAN Meeting #88e, Electronic Meeting, Jun. 22, 2020.

Indian Office Action dated Apr. 1, 2022, issued in Indian Patent Application No. 202041033739.

* cited by examiner

METHODS AND SYSTEMS FOR MANAGING MBS SERVICE CONTINUITY FOR A UE

TECHNICAL FIELD

The present disclosure relates to the field of Multicast Broadcast Service (MBS) communication systems and more particularly to managing MBS service continuity for a User Equipment (UE), upon state change and upon cell change.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Multicast Broadcast Service (MBS) services are primarily point-to-multipoint services, in which data is transmitted from a single source to a plurality of recipients/User Equipments (UEs). For reception and access of the MBS services, MBS control information is signalled to the UEs. The MBS control information is signalled to the UE in three ways, broadcast only, a combination of broadcast and unicast, and unicast only.

In conventional approaches, for cases, where the MBS control information is signalled to the UE using a unicast signaling, the UE has to enter a Radio Resource Control (RRC) Connected state in order to receive the unicast MBS service. Further, based on an adopted mechanism, the UE in an RRC Idle state or an RRC Inactive state may not be allowed to receive the MBS services directly. Thus, the UE has to enter the RRC Connected state in order to receive the MBS control information and to start receiving the MBS services/data traffic based on the MBS control information. As a number of UEs active in an MBS session may be large, it is not possible to maintain all the UEs in the RRC Connected state. Maintaining all the UEs with the ongoing MBS sessions may lead to limitations at a serving cell/Base Station (BS) and the unicast UEs may get affected. Therefore, the serving cell has to release some of the UEs with the ongoing MBS sessions, when the UEs enter one of, the RRC Inactive state, and the RRC Idle state, from the RRC Connected state. However, the UEs may still be interested in receiving the MBS services, when the MBS sessions are active/ongoing. Further, when the UEs are not able to continue receiving the MBS services in the RRC Idle state or the RRC Inactive state, the UEs may request the serving cell for an RRC connection again in order to continue the MBS services. This may be problematic to the UE from at least one of, admission control, congestion, power consumption perspectives, or the like, when the UE does not receive the service in the RRC Inactive state and the RRC Idle state, and also when the UE tries to establish RRC connection again.

FIG. 1 is an example sequence diagram depicting a scenario of releasing resources, configurations, and bearers for the UE to receive the MBS services, on entering the RRC Idle/Inactive state from the RRC Connected state.

At step 101, the UE enters the RRC Connected state by establishing an RRC connection with a BS/cell (for example: gNodeB (gNB)). At step 102, the UE receives the MBS control information from the gNB. At step 103, the UE establishes an MBS bearer (for example, a point-to-multipoint (PTM) bearer) with the BS to receive the at least one MBS service. At step 104, the UE receives the at least one MBS service using the received MBS control information and the established MBS bearer. At step 105, the UE receives an RRC release message or RRC release message with suspend configurations from the gNB to enter the RRC Idle/Inactive state from the RRC Connected state.

At step 106, the UE releases all radio bearers including the MBS bearer, and suspends all downlink and uplink activity, on entering the RRC Idle/Inactive state from the RRC Connected state. At step 107, the UE may not be able to continue receiving the at least one ongoing MBS service, as all the radio bearers have been released. At step 108, the UE stops receiving the MBS services.

The UE in the RRC Idle/Inactive state has to establish the RRC connection on a new cell upon cell reselection for receiving the at least one MBS service, which may cause large interruption to reception of the MBS services. In addition, it is also possible that the UE may select the cell, which does not support the MBS services.

On reselecting the new/neighbor cell that supports the interested or active MBS service, the UE still has to read the broadcast/MBS control information from the neighbor cell, or the UE has to enter the RRC Connected state in order to receive the MBS services. Thus, it is causing service interruption and delay in resuming the MBS services.

DISCLOSURE OF INVENTION

Technical Problem

The principal object of the embodiments herein is to disclose methods and systems for managing MBS service continuity on a User Equipment (UE), upon state change and upon cell change.

Solution to Problem

Accordingly, the embodiments herein provide methods and systems for managing Multicast and Broadcast Service (MBS) service continuity for a User Equipment (UE). The method includes receiving, by the UE from a Base Station (BS), a first message including MBS control information while operating in a first Radio Resource Control (RRC) state. The method includes establishing, by the UE with the BS, an MBS bearer for receiving at least one MBS service. The MBS bearer can be at least one of a point-to-multipoint (PTM) bearer, a point-to-point (PTP) bearer and a split MBS bearer. The method includes receiving, by the UE, the at least one MBS service in the first RRC state, based on the first message. The method includes entering, by the UE, a second RRC state from the first RRC state by releasing an RRC connection with the BS. The method includes continuing by the UE, reception of the at least one ongoing MBS service upon entering the second RRC state using the established MBS bearer. The first RRC state includes an RRC connected state and the second RRC state includes one of, an RRC Idle state and an RRC Inactive state.

The method disclosed herein also includes receiving, by the UE from the BS, signalling information on the MBS bearer allowed to be used for continuing the reception of the at least one MBS service upon entering the second RRC state from the first RRC state. The method includes receiving, by the UE, the signalling information on the MBS bearer by utilizing one of, a new field present in a third message, wherein the third message is bearer setup message including one of, a radio bearer configuration message (radioBearerConfig) and a cell group configuration message (cellGroupConfig); a sub-set of configurations of the MBS bearer; first configurations received from the BS, during the establishment of the MBS bearer; and second configurations in the second message received from the BS, wherein the first and second configurations signal the MBS bearer for continuing the reception of the at least one MBS service in the second RRC state, wherein the first and second configurations include a same configuration or different configurations for receiving at least one MBS service in the RRC Idle state and the RRC Inactive state.

The method disclosed herein also includes receiving, by the UE from the BS neighbor cell information in at least one of, the first message, the second message, the third message, and a unicast RRC message. The method includes continuing, by the UE, the reception of the at least one MBS service using at least one of, the neighbor cell information and the MBS bearer established with the BS.

Accordingly, the embodiments herein provide a User Equipment (UE) in a Multicast Broadcast Service (MBS) communication system. The UE is configured to receive from a Base Station (BS), a first message including MBS control information while operating in a first Radio Resource Control (RRC) state. The UE is configured to establish with the BS an MBS bearer for receiving at least one MBS service. The UE is configured to receive the at least one MBS service in the first RRC state, based on the first message. The UE is configured to enter a second RRC state from the first RRC state by releasing an RRC connection with the BS. The UE is configured to continue reception of the at least one ongoing MBS service upon entering the second RRC state using the established MBS bearer. The first RRC state includes an RRC connected state and the second RRC state includes one of, an RRC Idle state and an RRC Inactive state.

The UE is also configured to receive from the BS, signalling information on the MBS bearer allowed to be used for continuing the reception of the at least one MBS service upon entering the second RRC state from the first RRC state. The UE is configured to receive the signalling information on the MBS bearer by utilizing one of, a new field present in a third message, wherein the third message is bearer setup message including one of, a radio bearer configuration message (radioBearerConfig) and a cell group configuration message (cellGroupConfig); a sub-set of configurations of the MBS bearer; first configurations received from the BS, during the establishment of the MBS bearer; and second configurations in the second message received from the BS, wherein the first and second configurations signal the MBS bearer for continuing the reception of the at least one MBS service in the second RRC state, wherein the first and second configurations include a same configuration or different configurations for receiving at least one MBS service in the RRC Idle state and the RRC Inactive state.

The UE is also configured to receive from the UE, the neighbor cell information in at least one of, the first message, the second message, the third message, and a unicast RRC message. The UE is configured to continue the reception of the at least one MBS service using at least one of, the neighbor cell information and the MBS bearer established with the BS.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

Advantageous Effects of Invention

According to an embodiment of present disclosure methods and systems for managing MBS service continuity on a terminal, upon state change and upon cell change in a NR wireless network is provided.

BRIEF DESCRIPTION OF DRAWINGS

Embodiments herein are illustrated in the accompanying drawings, throughout which like reference letters indicate corresponding parts in the various figures. The embodiments herein will be better understood from the following description with reference to the drawings, in which.

MODE FOR THE INVENTION

Figure 1:
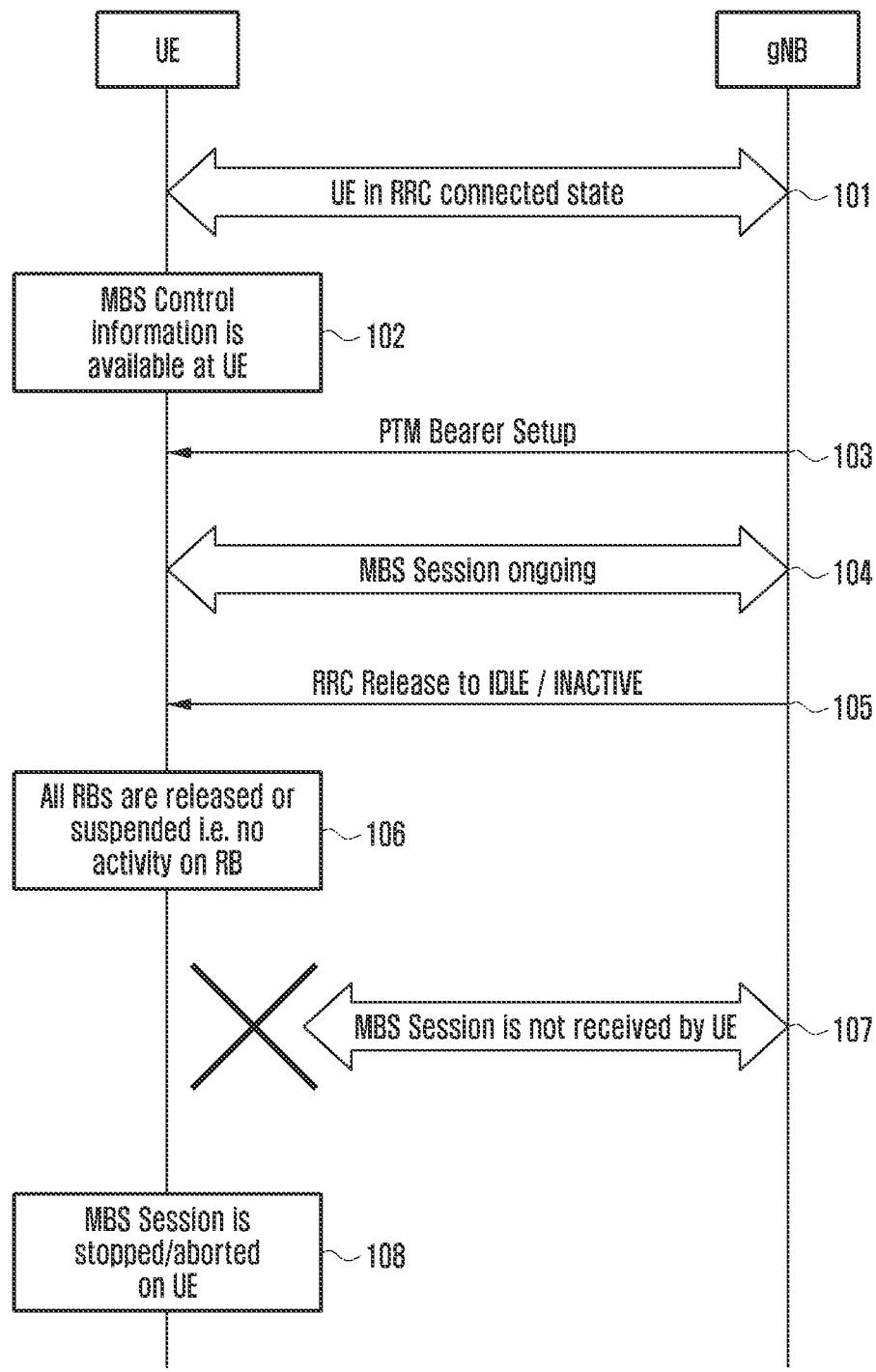
FIG. 1 is an example sequence diagram depicting a scenario of releasing resources, configurations, and bearers for a User Equipment (UE) to receive Multicast Broadcast Service (MBS) services, on entering a Radio Resource Control (RRC) Idle/Inactive state from an RRC Connected state.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Embodiments herein manage Multicast Broadcast Service (MBS) service continuity for a User Equipment (UE), upon state change and cell change.

Referring now to the drawings, and more particularly to FIGS. 2 through 13, where similar reference characters denote corresponding features consistently throughout the figures, there are shown example embodiments.

Figure 2:
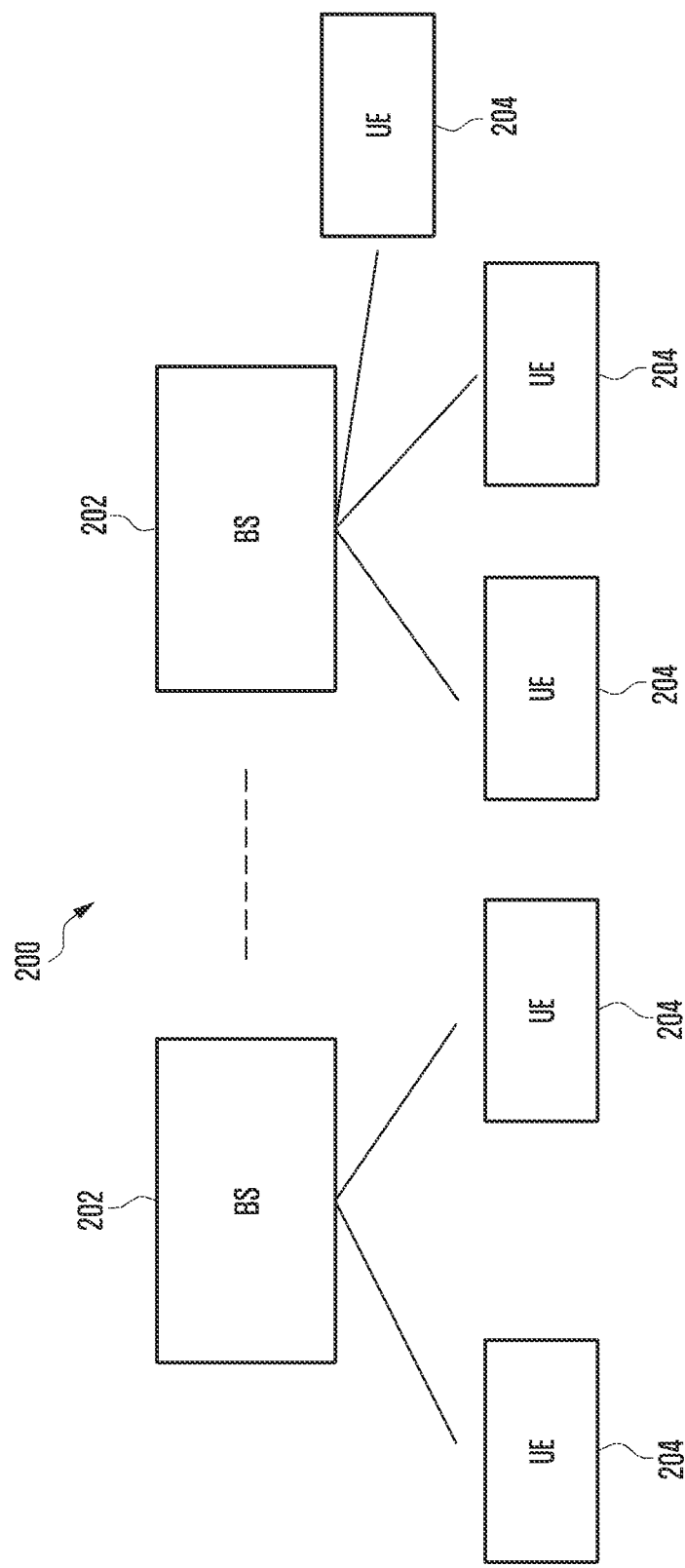
FIG. 2 is an MBS communication system, according to embodiments as disclosed herein.

FIG. 2 is a Multicast Broadcast Service (MBS) communication system 200, according to embodiments as disclosed herein. The MBS communication system 200 referred herein may be configured to provide MBS services to a plurality of recipients. In an embodiment, the MBS services include one of, a point-to-multipoint (PTM) service/broadcast service, a point-to-point (PTP) service/unicast service, and a combination of the PTM service and the PTP service. Examples of the MBS services may be, but are not limited to, a streaming service (streaming of multimedia data such as audio, video, text and so on), a file download service, a carousel service (combining file download service and streaming service), a television (TV) service, and so on.

The MBS services may be used to support a wide variety of applications such as, but are not limited to, public safety and mission critical applications, Vehicle to Everything (V2X) application, Internet Protocol (IP)v4/IPv6 multicast delivery applications, Internet Protocol television (IPTV) software delivery applications, group communication related applications, Internet of Things (IoT) applications or any other applications which have different Quality of Service (QoS) requirements and categorized as critical and non-critical services.

The MBS communication system 200 includes a plurality of Base Stations (BSs) 202, and a plurality of User Equipments (UEs) 204.

The BS(s) 202 may be a radio node configured to communicate with the one or more UEs 204. The BS 202 may communicate with the one or more UEs 204 via a same or different Radio Access Technologies (RATs). Examples of the RATs may be, but are not limited to, a Third Generation Partnership 3rd Generation Partnership Project (3GPP) Long Term Evolution (LTE/4G), an LTE-Advanced (LTE-A), a Fifth Generation (5G) New Radio, a 6G wireless system, a Wireless Local Area Network (WLAN), a Worldwide Interoperability for Microwave Access (WiMAX/IEEE 802.16), a Wi-Fi (IEEE 802.11), an Evolved-UTRA (E-UTRA), or any other next generation network. The BS 202 provides at least one cell to the UEs 204, wherein the at least one cell indicates a geographical area in which services (the MBS services herein) may be offered to the UEs 204. The BS 202 may be at least one of, a macro-BS, a micro-BS, a femto-BS, a pico-BS, and so on. Embodiments herein use the terms such as 'BSs", "cells", "macro-BSs", "pico-BSs", "eNodeBs (eNBs)", "gNBs", and so on, interchangeably to refer to a Base Transceiver System (BTS)/station that communicates with the one or more UEs 204.

The BS 202 may be configured to serve the one or more UEs 204 with the MBS services, which have been received from an MBS gateway/server (not shown). The BS 202 broadcasts MBS control information to the one or more UEs 204 for the reception of the MBS services.

The UE(s) 204 referred herein may be a user device supporting reception of the MBS services. Examples of the UE 204 may be, but are not limited to, a terminal, a mobile phone, a smartphone, a tablet, a phablet, a personal digital assistant (PDA), a laptop, a computer, a wearable computing device, a vehicle infotainment device, an Internet of Things (IoT) device, a Wireless Fidelity (Wi-Fi) router, a USB dongle, a television, a vehicle with communication facility (for example; a connected car), or any other processing device supporting the MBS services.

The UE 204 may operate in various Radio Resource Control (RRC) states such as, but are not limited to, an RRC Connected state, an RRC Idle state, an RRC Inactive state, and so on. Each RRC state of the UE 204 may be intuitively inferred by one of ordinary skill in the art by referring to the 3GPP specification, and thus, its detailed description is omitted.

The UE 204 may transit between the various RRC states. In an example, the UE 204 enters a second RRC state from the first RRC state, on receiving a RRC message from the BS 202. The first RRC state includes the RRC Connected state. The second RRC state includes one of, the RRC Idle state and the RRC Inactive state. The RRC message includes one of, an RRC release message/RRC release message with redirection for entering the RRC Idle state from the RRC Connected state, and an RRC release message with suspend configurations for entering the RRC Inactive state from the RRC Connected state. Embodiments herein use the terms such as "first RRC state", "RRC Connected state", and so on, interchangeably to refer to a state of the UE 204, where radio resources have been established with the BS 202. Embodiments herein use the terms "second RRC state", "RRC Idle state/RRC Inactive state", "release state", and so on, interchangeably to refer to a state of the UE 204, where the radio resources have been released with the BS 202. Embodiments herein use the terms "second message", "RRC message", "RRC connection release message", "RRC release message with redirection", "RRC release message", "RRC release message with suspend configurations", and so on, interchangeably to refer to a message received by the UE 204 from the BS 202 indicating the UE 204 to enter the second RRC state from the first RRC state.

The UE 204 receives the RRC message from the BS 202 due to at least one of, a congestion on the BS 202, power saving requirement of the UE 204, a UE preference for one of, the RRC Idle state and the RRC Inactive state, required signal strength to continue the at least one MBS service in the second RRC state, termination of the at least one MBS service received through the PTP bearer and/or the split MBS bearer, deactivation of the at least one MBS service, and so on.

In another example, the UE 204 enters the second RRC state from the first RRC state on detecting one or more internal events. Examples of the internal events may be, but are not limited to, a loss of connection, an RRC release required by upper/higher layer, an expiry of an MBS data inactivity timer, deactivation of the one or more MBS services, and so on. In an example, the loss of connection includes at least one of, but is not limited to, a Radio Link Failure (RLF), out of synchronization, loss of coverage, the UE 204 switching from one network to another, if the UE 204 is multi-Subscriber Identity Module (SIM), and so on.

In another example, the UE 204 enters the RRC Idle state from the RRC Inactive state or vice-versa, based on one or more conditions. Examples of the conditions may be, but are not limited to, the reception of the RRC release message, a reception of an indication for deactivation of a multicast session, a reception of an indication of the multicast session, an expiration of unicast and/or the MBS data Inactivity Timer, losing of interest by the UE 204 in receiving the current multicast session, and so on. The multicast session/MBS session herein refers to a session initiated on the BS 202 to provide the MBS services to the UEs 204.

In another example, the UE 204 enters the first state from the second state in one more scenarios. Examples of the one or more scenarios may be, but are not limited to, an initiation of a service request or a group join request or a group release request from the higher layer for one or more MBS services, a reception of a group notification (activation) of the multicast session, an indication of short back off duration by the BS 202, upon expiry of the back-off timer indicated by BS 202, and so on. In an example, the service request or the group join request or the group release request from the higher layer may be for at least one of, receiving the one or more MBS services, receiving, or initiating a release from the MBS session, or initiating a modification of the MBS session, or the like.

Embodiments herein manage MBS service continuity for the UE 204, upon transitioning from one RRC state to another RRC state or from one BS/cell (serving cell/source cell) to another BS/cell (target cell/neighbor cell).

The BS 202 broadcasts a first message including the MBS control information corresponding to the one or more MBS services to the plurality of UEs 204. The UE 204 in the plurality of UEs 204 operating in the first state/RRC Connected state receives the MBS control information corresponding to the one or more MBS services from the BS 202. Embodiments herein use the terms "first message", "MBS message", "MBS control information", and so on, interchangeably to refer to a message carrying the MBS control information corresponding to the one or more MBS services.

The BS 202 sends configurations of an MBS bearer to the UE 204. Based on the configurations of the MBS bearer, the UE 204 and the BS 202 establishes the MBS bearer with each other, for receiving the one or more MBS services. In an example, the MBS bearer is a PTM bearer for receiving the one or more MBS services, wherein the one or more MBS services include the PTM services. In another example, the MBS bearer is a PTP bearer for receiving the one or more MBS services, wherein the one or more MBS services include the PTP services. In another example, the bearer is a split MBS bearer for receiving the one or more MBS services, wherein the MBS service includes a combination of the PTM services and the PTP services. The split bearer is a single bearer comprising a combination of PTM reception paths/legs and PTP reception paths/legs.

The configurations may include parameters such as, but are not limited to, a bearer type indicating if the MBS bearer is the PTP/PTM/split MBS bearer, radio bearer configurations including a Medium Access Control (MAC), a Radio Link Control (RLC), a Packet Data Convergence Protocol (PDCP) and a Service Data Adaptation Protocol (SDAP) configuration, a group Radio Network Temporary Identifier (RNTI) used to monitor the reception of the one or more MBS services, Discontinuous Reception (DRX) scheduling configurations, Hybrid Automatic Repeat Request (HARD) configurations, BandWidth Part (BWP)/common Frequency Resource (CFR) to receive the one or more MBS services, and so on.

The BS 202 broadcasts the MBS services to the plurality of UEs 204. The UE 204 in the first RRC state receives the one or more MBS services using the received MBS information over the MBS bearer established with the BS 202.

The UE 204 enters the second RRC state (the RRC Idle state or the RRC Inactive state) from the first RRC state (the RRC Connected state), while receiving the one or more MBS services. In an example, the UE 204 enters the second RRC state from the first RRC state, on receiving the RRC message from the BS 202. In another example, the UE 204 enters the second RRC state from the first RRC state, on detecting the one or more internal events.

In an embodiment, on entering the second RRC state from the first RRC state, the UE 204 retains the MBS bearer established with the BS 202 by not releasing any of the MBS bearers and associated L2 entities that are configured to receive the one or more MBS services. The UE 204 continues the reception of the ongoing one or more MBS services from the BS 202 using the retained MBS bearer. Therefore, the UE 204 continues the reception of the one or more MBS services without any interruption, upon the RRC state change.

In an embodiment, the BS 202 provides the UE 204 with signaling information on the MBS bearer allowed to be used for continuing the reception of the one or more MBS services, upon entering the second RRC state from the first RRC state.

In an example, the BS 202 signals the allowed MBS bearer to the UE 204 in a bearer setup message (also be referred as a third message). The bearer setup message may be signaled in one or more ways such as, but are not limited to, as a part of an RRC Reconfiguration message, as a part of the RRC message (including the RRC release message and the RRC release message with suspend configurations), as a part of an MBS specific message, as a part of a broadcasted MBS control signaling, and so on. In an example, the bearer setup message includes a radio bearer configuration message (radioBearerConfig). In another example, the bearer setup message includes a cell group configuration message (cellGroupConfig). The bearer setup message includes an additional new field to indicate the MBS bearer, which has to be allowed to use for continuation of the reception of the one or more MBS services. Embodiments herein use the terms "third message" ", bearer setup message", and so on, interchangeably through the document. The new field introduced may be signaled in one or combination of the ways such as, but are not limited to, as a flag indicating if the MBS bearer can continue to receive the MBS data/services in the second RRC state, an indication about the state(s) in which the MBS bearer can continue to receive data.

In another example, the BS 202 signals the allowed MBS bearer to the UE 204 in a sub-set of configurations of the MBS bearer. Since all the functionality/operations of sub layers in a radio bearer such as but are not limited to, absence of RLC Automatic Repeat Request (ARQ), Hybrid automatic repeat request (HARQ) mechanism, BWP configurations or the like may not be supported across different the RRC states of the UE 204, the BS 202 signals the subset of configurations to the UE 204 for continued operation of the MBS bearer when moving from the first RRC state to the second RRC state.

In another example, the BS 202 signals the MBS bearer to the UE 204 in first configurations, during the establishment of the MBS bearer. The BS 202 signals the first configurations, as part of the RRC reconfiguration message and/or an MBS specific bearer configuration message, the configurations of MBS bearers which can continue the reception in the second RRC state, and so on. The BS 202 signals the first configurations in one or combination of the ways such as, but are not limited to, signaling an indication that MBS bearer established for the reception of the MBS services in the first RRC state can continue to receive in the second RRC state, a separate set of configurations to be used for the MBS bearer for the reception of the MBS services when moving to the second RRC state, and so on.

In another example, the BS 202 signals the MBS bearer to the UE 204 using second configurations. The BS 202 signals the second configurations as a part of the RRC message (including the RRC release message and/or the RRC release message with suspend configurations). The BS 202 signals the second configurations in one or combination of the following ways, but are not limited to, signaling of MBS bearer indices which can continue the reception of the MBS services in the second RRC state, signaling of a new set of MBS bearer configurations to be used for reception of the MBS services in the second RRC state, an indication of the MBS services which can be received in the second RRC state, thus implicitly indicating all the MBS bearers associated with the MBS services can continue the reception of the MBS services in the second RRC state. In an example, the first configurations and the second configurations include a same configuration for the RRC Idle state and/or the RRC Inactive state. In another example, the first configurations and the second configurations include different configurations for the RRC Idle state and the RRC Inactive state. This can be due to the difference/limitations of functionalities in the sub layers of the radio bearer such as but are not limited to, the ARQ mechanism, the HARQ feedback mechanism, the BWP/CFR to be utilized to receive the MBS services, signaling mechanism (for example; a dedicated or common signaling mechanism), configured timers like an inactivity timer, a discard timer, a reassembly timer or any other timers, which can be different for the RRC Idle state and the RRC Inactive state, and so on.

The UE 204 receives the signaling information on the allowed MBS bearer from the BS 202 in one of, the bearer setup message, the RRC reconfiguration message and the RRC release message, comprising the sub-set of the configurations of the MBS bearer, the first configurations, the second configurations, or the like. The UE 204 continues the reception of the ongoing one or more MBS services using the allowed MBS bearer, on entering the second RRC state from the first RRC state.

In an embodiment, the BS 202 provides the UE 204 with the signaling information on the one or more MBS services allowed to be received upon entering the second RRC state from the first RRC state. The MBS services which have been allowed to continue in the second RRC state may be one of, "low" Quality of Service (QoS) services (for example: low QoS multicast services), high QoS multicast services, public safety and mission critical services, broadcast services and so on. The BS 202 provides the signaling information on the allowed one or more MBS services to the UE 204 in the bearer setup message. The UE 204 identifies the allowed one or more MBS services, by receiving the bearer setup message from the BS 202. The UE 204 continues the reception of the allowed one or more MBS services using the MBS bearer established with the BS 202, upon entering the second RRC state from the first RRC state. Alternatively, the UE 204 continues the reception of the allowed one or more MBS services using the allowed MBS bearer signalled by the BS 202, upon entering the second RRC state from the first RRC state.

In an embodiment, the BS 202 signals the UE 204, a list of MBS bearers allowed to be used for continuing the reception of the one or more MBS services, upon entering the second RRC state from the first RRC state. The BS 202 signals the UE 204, the list of MBS bearers in the RRC message. The UE 204 identifies the allowed list of MBS bearers from the RRC message received from the BS 202. The UE 204 continues the reception of the ongoing one or more MBS services based on the identified allowed list of MBS bearers, upon entering the second RRC state from the first RRC state.

In an embodiment, the BS 204 provides neighbor cell information to the UE 204 to continue the reception of the one or more MBS services, upon entering the second RRC state from the first RRC state.

In an example, the neighbor cell information includes information such as, but are not limited to, one or more neighbor cells supporting the ongoing one or more MBS services, one or more neighbor cell supported MBS services, and so on and parameters related to the neighbor cells. The parameters related to the neighbor cells may be, but are not limited to, physical cell identity, frequency, list and/or bitmap for the neighbor cell(s), MBS services mapping information, and so on. The one or more neighbor cells may or may not support a Single Frequency Network (SFN). The one or more neighbor cell supported MBS services are the MBS services supported by the one or more neighbor cells.

In another example. the neighbor cell information includes information such as, but are not limited to, scheduling and timing information, the MBS control information, and so on, of the one or more neighbor cell supported MBS services. The scheduling and timing information depicts at least one of, but is not limited to, a frame, a sub-frame, a slot, an offset, and so on, on which the UE 204 may receive the one or more MBS services from the one of the neighbor cells. Using the scheduling and timing information, the UE 204 may tune the neighbor cell and adjust a Radio Frequency (RF) to receive the one or more MBS services from the one or more neighbor cells on its corresponding slots. Tuning the neighbor cell and adjusting the RF to receive the one or more MBS services may be optimized if the BS 202 follows a same scheduling on the serving cell and the neighbor cells. The BS 204 schedules a SFN based transmission that is packets of the MBS service is synchronized in scheduling in a given MBS area, which may be achieved if the source cell/BS 202 informs the UE 204 with the list of neighbor cells on which the transmission of the active MBS service is synchronized with that of the serving cell in the MBS control information and/or the bearer setup and/or the RRC release message.

In another example, the neighbor cell information indicates whether transmission of the one or more MBS services on the one or more neighbor cells are synchronized or not synchronized with the one or more MBS services being transmitting on the serving cell.

In an example, the BS 202 provides the neighbor cell information to the UE 204 in the first message carrying the MBS control information. In another example, the BS 202 provides the neighbor cell information to the UE 204 in the RRC message (for example: the RRC reconfiguration message, the RRC release message, the RRC release message with suspend configurations, or the like). In another example, the BS 202 provides the neighbor cell information to the UE 204 in the bearer setup message. In another example, the BS 202 provides the neighbor cell information to the UE 204 in a unicast RRC message. In another example, the BS 202 provides the neighbor cell information to the UE 204 in a new Information Element (IE). The new IE includes at least one of, but is not limited to, a list of MBS services offered by the same cell and/or frequency, per service-based list of cells/frequencies offering that services subscribed by the UE, the list of services offered by the neighboring cells/frequencies, and so on. In another example, the BS 202 provides the neighbor cell information to the UE 204 in Idle and/or Inactive mode cell reselection parameters. In another example, the BS 202 provides the neighbor cell information to the UE 204 in Idle and/or Inactive mode MBS cell reselection parameters. In an example, the Idle and/or Inactive mode reselection parameters or the Idle and/or Inactive mode MBS cell reselection parameters include the list of cells/frequencies to prioritize when performing a cell reselection. The Idle and/or Inactive mode reselection parameters may be signaled in at least one of or combination of the following ways, as a part of the RRC message (including the RRC release message and/or the RRC release message with suspend configurations), as a part of the MBS control signaling, as a part of MBS specific broadcast signaling, as a part of a unicast RRC message, and so on. The signaling of the Idle and/or Inactive mode reselection parameters can be implicit by providing a list of cells/frequencies and the supported services, so that the UE 204 may select the cell/frequency which supports the interested MBS service. Also, the BS 202 signals explicitly by providing a priority list of cells/frequencies to the UEs 204 to consider for the cell reselection.

The UE 204 receives the neighbor cell information from the BS 202 using one of, the MBS control information, the RRC message, the bearer setup message, the new Information element (IE), the Idle and/or Inactive mode cell reselection parameters, the Idle and/or Inactive mode MBS cell reselection parameters, and so on. The UE 204 continues the reception of the one or more MBS services based on the neighbor cell information and the MBS bearer established with the BS 202, upon entering the second RRC state from the first RRC state.

In an embodiment, on receiving the neighbor cell information and upon entering the second RRC state from the first RRC state, the UE 204 being camped on the serving cell/BS 202 uses the MBS bearer to continue receiving the one or more ongoing MBS services from the one or more neighbor cells. Alternatively, the UE 204 being connected on the serving cell/BS 202 uses the MBS bearer to receive one or more new MBS services from the one or more neighbor cells upon entering the second RRC state from the first RRC state. The one or more new MBS services are the neighbor cell supported MBS services.

In another embodiment, on receiving the neighbor information and upon entering the second RRC state from the first RRC state, the UE 204 reselects the neighbor cell based on the received neighbor cell information. The UE 204 continues the reception of the one or more ongoing MBS services from the reselected neighbor cell using the MBS bearer established with the BS 202. Also, the UE 204 continues the reception of the one or more new MBS services from the reselected neighbor cell using the MBS bearer established with the BS 202.

In an embodiment, the UE 204 performs the cell reselection or reselects the neighbor cell, based on at least one of, but are not limited to, mapping information of the MBS services, preferred frequency, a Service Area Identity (SAI), and so on. The UE 204 may receive the mapping information of the MBS services from an additional or new System Block Information (SIB) (hereinafter referred as an MBS SIB) from the BS 202. The UE 204 may be configured with the SAI, or a list of SAIs associated with MBS service of interest. The preferred frequency may be a frequency which supports the SAI associated with the MBS service in which the UE 204 is interested in, which have been indicated to the UE 204 in the MBS SIB from an MBS-SAI-information (info)-list. In case of multiple interested MBS services, an order of the preferred frequency is determined based on a priority of the MBS services. In such a scenario, the UE 204 determines the preferred frequency which supports the highest priority SAI. Once the preferred frequency is determined, the UE 204 selects the cell associated with the preferred frequency for receiving the MBS services. The selected cell is the cell, which broadcasts a maximum number of interested SAIs.

Thus, on receiving the neighbor cell information, the UE 204 directly starts monitoring required slots and receives the one or more MBS services without having to receive and read the MBS control information on the neighbor cell, on entering the second RRC state from the first RRC state.

In an embodiment, the BS 202 provides the UE 204, the signaling information on the MBS bearer that is allowed to be used for continuing or recontinuing the reception of the at least one MBS service upon entering the first RRC state from the second RRC state or upon entering the RRC Idle state from the RRC Inactive state or vice-versa.

On receiving the signaling information and upon entering the first RRC state from the second RRC state or upon entering the RRC Idle state from the RRC Inactive state or vice-versa, the UE 204 continues or recontinues the ongoing one or more MBS services using the signalled MBS bearer.

In an embodiment, the UE 204 identifies a deactivated status. The deactivated status indicates deactivation of the one or more MBS services in the first RRC state or the second RRC state. The UE 204 identifies the deactivated status based on a combination of at least one of:
  a signaling received from the BS 202 through a NAS signaling indicating the deactivation of the one or more MBS services;
  a signaling received from the BS 202 as a part of the RRC reconfiguration message indicating the deactivation of the one or more MBS services;
  an MBS specific RRC message received from the BS 202 explicitly using a list of MBS session IDs to deactivate the one or more MBS services;
  an MBS specific RRC message received from the BS 202 implicitly by releasing all the MBS bearers associated with the one or more specific MBS services/sessions;
  a signaling received from the BS 202 as a part of the RRC message indicating the deactivation of the one or more MBS services (including the RRC release message, the RRC release message with suspend configurations, or the like),
  an indication received from the BS 202 in a MAC Control Element (MAC CE) about the deactivation of the one or more MBS services, or the like.

When the UE 204 is in the second RRC state, the BS 202 may page or group page to the UE 204 for at least one of, notifying the activation of the MBS sessions, entering the first state from the second state to continue the reception of the one or more MBS services, and continuing the reception of the one or more MBS services in the second RRC state.

On identifying the deactivated status, the UE 204 terminates the reception of the one or more MBS services using the MBS bearer, preserves the deactivated status upon entering the second RRC state from the first RRC state or vice-versa, or upon entering the RRC Idle state from the RRC Inactive state or vice-versa.

FIG. 2 shows exemplary elements of the MBS communication system 200, but it is to be understood that other embodiments are not limited thereon. In other embodiments, the MBS communication system 200 may include less or a greater number of elements/units. Further, the labels or names of the units are used only for illustrative purpose and does not limit the scope of the embodiments herein. One or more units can be combined together to perform same or substantially similar function in the MBS communication system 200.

Figure 3:
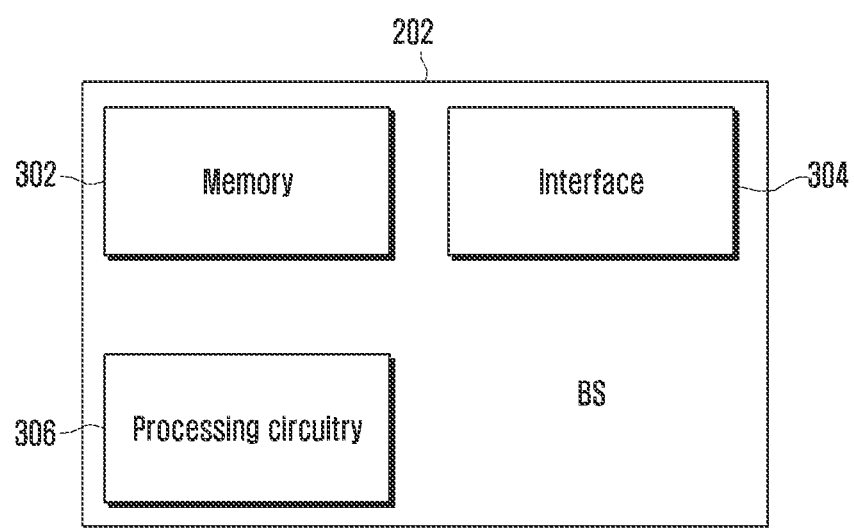
FIG. 3 is an example block diagram depicting various components of a Base Station (BS) in the MBS communication system, according to embodiments as disclosed herein.

FIG. 3 is an example block diagram depicting various components of the BS 202 in the MBS communication system 200, according to embodiments as disclosed herein. The BS 202 includes a memory 302, an interface 304, and a processing circuitry 306. The BS 202 may also include at least one of, at least one antenna, at least one RF transceiver, a transmission processing circuitry, a reception processing circuitry, and so on (not shown).

The memory 302 stores at least one of, the configurations of the MBS bearer established with the UEs 204, the allowed MBS bearers for the UEs 204, the allowed one or more MBS services for the UEs 204, the list of allowed MBS bearers for the UEs 204, the MBS control information, the RRC message, the bearer set up message, and so on. Examples of the memory 302 may be, but are not limited to, NAND, embedded Multimedia Card (eMMC), Secure Digital (SD) cards, Universal Serial Bus (USB), Serial Advanced Technology Attachment (SATA), solid-state drive (SSD), and so on. The memory 302 may also include one or more computer-readable storage media. The memory 302 may also include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 302 may, in some examples, be considered a non-transitory storage medium. The term "non-transitory" may indicate that the storage medium is not embodied in a carrier wave or a propagated signal. However, the term "non-transitory" should not be interpreted to mean that the memory 302 is non-movable. In some examples, the memory 302 can be configured to store larger amounts of information than the memory. In certain examples, a non-transitory storage medium may store data that can, over time, change (e.g., in Random Access Memory (RAM) or cache).

The interface 304 may be configured to enable the BS 202 to communicate with the UEs 204 through an interface. Examples of the interface may be, but are not limited to, a wired or wireless fronthaul interface, a wired or wireless backhaul interface, or any other structure supporting communications over a wired or wireless connection. The interface 304 can be defined as a transceiver.

The processing circuitry 306 includes at least one of, a single processer, a plurality of processors, a controller, multiple homogeneous or heterogeneous cores, multiple Central Processing Units (CPUs) of different kinds, microcontrollers, special media, and other accelerators. The processing circuitry 306 may be configured to establish the MBS bearer for the UE 204 operating in the RRC Connected state. The established MBS bearer may be used by the UE 204 to continue the reception of the one or more ongoing MBS services, upon entering the second RRC state from the first RRC state.

The processing circuitry 306 performs an operation of the BS 202 described a plurality of embodiment of the disclosure.

The processing circuitry 306 may also be configured to provide the UE 204, the signaling information on:
- the MBS bearer allowed to be used for continuing the reception of the at least one MBS service upon entering the second RRC state from the first RRC state. The processing circuitry 306 signals the allowed MBS bearer to the UE 204 in one of, the bearer setup message, the sub-set of configurations of the MBS bearer, the first configurations during the establishment of the MBS bearer, the second configurations in the RRC message, or the like;
- the one or more MBS services allowed to be received upon entering the second RRC state from the first RRC state. The processing circuitry 306 signals the allowed one or more MBS services to the UE 204 in the bearer setup message;
- the list of MBS bearers allowed to be used for continuing the reception of the at least one MBS service upon entering the second RRC state from the first RRC state. The processing circuitry 306 signals the list of MBS bearers to the UE 204 in the RRC message;
- the neighbour cell information to the UE 204 in at least one of, the MBS control information, the RRC message, the bearer setup message, the unicast RRC message, the new IE, the Idle and/or Inactive mode cell reselection parameters, the Idle and/or Inactive mode MBS cell reselection parameters, or the like; and
- the MBS bearer allowed to be used for continuing or recontinuing the reception of the at least one MBS service upon entering the first RRC state from the second RRC state or upon entering the RRC Idle state from the RRC Inactive state or vice-versa.

FIG. 3 shows exemplary elements of the BS 202, but it is to be understood that other embodiments are not limited thereon. In other embodiments, the BS 202 may include less or a greater number of elements/units. Further, the labels or names of the units are used only for illustrative purpose and does not limit the scope of the embodiments herein. One or more units can be combined together to perform same or substantially similar function in the BS 202.

Figure 4:
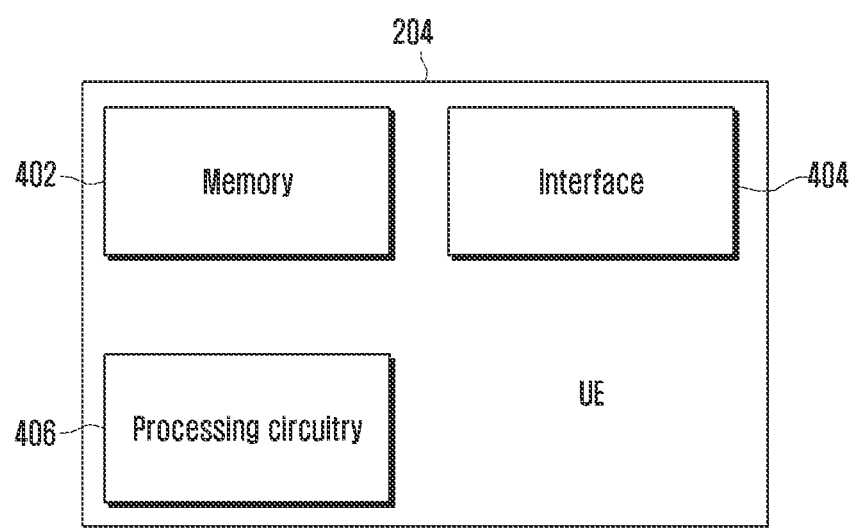
FIG. 4 is an example block diagram depicting various components of a UE in the MBS communication system, according to embodiments as disclosed herein.

FIG. 4 is an example block diagram depicting various components of the UE 204 in the MBS communication system 200, according to embodiments as disclosed herein. The UE 204 includes a memory 402, an interface 404, and a processing circuitry 406. The UE 204 may also include at least one of, at least one antenna, at least one RF transceiver, a transmission processing circuitry, a reception processing circuitry, and so on (not shown).

The memory 402 stores at least one of, the configurations of the MBS bearer, the RRC message, the bearer setup message, the idle mode reselection parameters, the idle mode MBS reselection parameters, the neighbor cell information, and so on. Examples of the memory 402 may be, but are not limited to, NAND, embedded Multimedia Card (eMMC), Secure Digital (SD) cards, Universal Serial Bus (USB), Serial Advanced Technology Attachment (SATA), solid-state drive (SSD), and so on. The memory 402 may also include one or more computer-readable storage media. The memory 402 may also include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 402 may, in some examples, be considered a non-transitory storage medium. The term "non-transitory" may indicate that the storage medium is not embodied in a carrier wave or a propagated signal. However, the term "non-transitory" should not be interpreted to mean that the memory 302 is non-movable. In some examples, the memory 402 can be configured to store larger amounts of information than the memory. In certain examples, a non-transitory storage medium may store data that can, over time, change (e.g., in Random Access Memory (RAM) or cache).

The interface 404 may be configured to enable the UE 204 to communicate with the BS 202 through an interface. Examples of the interface may be, but are not limited to, a wired or wireless fronthaul interface, a wired or wireless backhaul interface, or any other structure supporting communications over a wired or wireless connection. The interface 404 can be defined as a transceiver.

The processing circuitry 406 includes at least one of, a single processer, a plurality of processors, a controller, multiple homogeneous or heterogeneous cores, multiple Central Processing Units (CPUs) of different kinds, microcontrollers, special media, and other accelerators. The processing circuitry 406 performs an operation of the UE 104 described a plurality of embodiment of the disclosure.

In an embodiment, the processing circuitry 406 may be configured to enable the UE 204 for continuing the reception of the one or more MBS services, upon the RRC state change or the cell change.

The processing circuitry 406 receives the MBS control information corresponding to the one or more MBS services from the BS 202, when the UE 204 is in the RRC connected mode. On receiving the MBS control information, the processing circuitry 406 receives the configurations of the MBS bearer and establishes the MBS bearer with the BS 202. The processing circuitry 406 identifies the transition of the UE 204 from the first RRC state to the second RRC state, due to at least one of, the RRC message received from the BS 202, occurrence of the one or more internal events, and so on. On transitioning from the first RRC state to the second RRC state, the processing circuitry 406 enables the UE 204 to continue the reception of the one or more ongoing MBS services using the MBS bearer established with the BS 202.

Also, the processing circuitry 406 receives MBS bearer information and/or the neighbor cell information from the BS 202, while operating in the first RRC state.

In an example, the MBS bearer information includes at least one of, the MBS bearer, the one or more MBS services, the list of MBS bearers, and so on, allowed to be used for continuing the reception of the at least one MBS service, on the UE 204 entering the second RRC state from the first RRC state. The processing circuitry 406 receives the MBS bearer information using at least one of, the MBS control information, the RRC message, the bearer setup message, the sub-set of configurations of the MBS bearer, the first configurations, the second configurations, and so on.

In an example, the processing circuitry 406 receives the neighbor cell information including the one or more neighbor cells supporting the ongoing one or more MBS services, the one or more neighbor cell supported MBS services, or the like in the MBS control information or the RRC message from the BS 202. In another example, the processing circuitry 406 receives the neighbor cell information including the scheduling and timing information, the MBS control information, or the like, of the one or more neighbor cell supported MBS services in the RRC message from the BS 202. In another example, the processing circuitry 406 receives the neighbor cell information indicating whether transmission of the one or more MBS services on the one or more neighbor cells are synchronized or not synchronized with the one or more MBS services being transmitting on the serving cell in the MBS control information or the RRC message from the BS 202.

The processing circuitry 406 enables the UE 204 to continue the reception of the one or more ongoing MBS services based on the MBS bearer information and the neighbor cell information, upon entering the second RRC state from the first RRC state or moving to the neighbor cell/target cell from the serving cell/source cell.

On receiving the neighbor cell information and upon entering the second RRC state from the first RRC state, the processing circuitry 406 enables the UE 204 being connected on the serving cell/BS 202 to use the MBS bearer to continue receiving the one or more ongoing MBS services from the one or more neighbor cells. Alternatively, the processing circuitry 406 enables the UE 204 being connected on the serving cell/BS 202 to use the MBS bearer to receive one or more new MBS services from the one or more neighbor cells upon entering the second RRC state from the first RRC state. The one or more new MBS services are the neighbor cell supported MBS services.

Alternatively, on receiving the neighbor information and upon entering the second RRC state from the first RRC state, the processing circuitry 406 reselects the neighbor cell from the received neighbor cell information. The processing circuitry 406 enables the UE 204 to continue the reception of the one or more ongoing MBS services or the new MBS services from the reselected neighbor cell using the MBS bearer established with the BS 202.

In an embodiment, the processing circuitry 406 also receives the signaling information from the BS 202 on the MBS bearer allowed to be used for continuing or recontinuing the reception of the at least one MBS service, on the UE 204 entering the first RRC state from the second RRC state or upon entering the RRC Idle state from the RRC Inactive state or vice-versa. The processing circuitry 406 enables the UE 204 to continue or recontinue the reception of the at least one MBS service using the allowed MBS bearer, upon entering the first RRC state from the second RRC state or upon entering the RRC Idle state from the RRC Inactive state or vice-versa.

In an embodiment, the processing circuitry 406 may also be configured to identify the deactivated status. The deactivated status indicates deactivation of the one or more MBS services in the first RRC state or the second RRC state. On identifying the deactivated status, the processing circuitry 406 terminates the reception of the one or more MBS services using the MBS bearer, and preserves the deactivated status on the UE 204 entering the second RRC state from the first RRC state or vice-versa, or on the UE 204 entering the RRC Idle state from the RRC Inactive state or vice-versa.

FIG. 4 shows exemplary elements of the UE 204, but it is to be understood that other embodiments are not limited thereon. In other embodiments, the UE 204 may include less or a greater number of elements/units. Further, the labels or names of the units are used only for illustrative purpose and does not limit the scope of the embodiments herein. One or more units can be combined together to perform same or substantially similar function in the UE 204.

Figure 5:
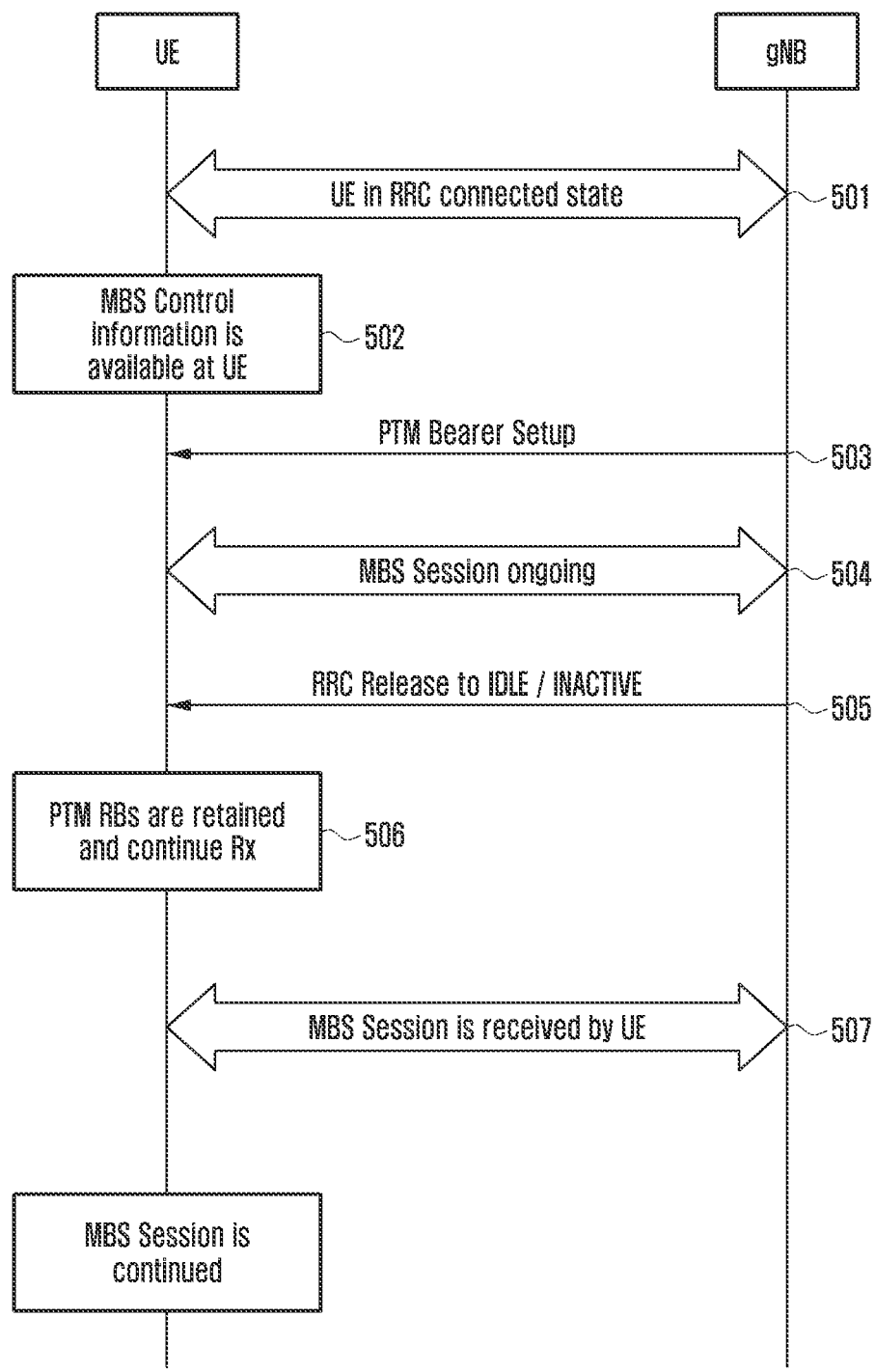
FIG. 5 is an example sequence diagram depicting a process of continuing reception of ongoing MBS services for the UE using an established MBS bearer, on the UE entering a second RRC state from a first RRC state, according to embodiments as disclosed herein.

FIG. 5 is an example sequence diagram depicting a process of continuing the reception of the ongoing MBS services on the UE 204 using the established MBS bearer, on the UE 204 entering the second RRC state from the first RRC state, according to embodiments as disclosed herein.

At step 501, the UE 204 starts operating in the first state/RRC Connected state. At step 502, the UE 204 receives the MBS control information/first message corresponding to the one or more MBS services from the BS 202. At step 503, the UE 204 establishes the MBS bearer with the BS 202, on receiving the configurations of the MBS bearer from the BS 202.

At step 504, the UE 204 in the first RRC state starts receiving the one or more MBS services from the BS 202 based on the received MBS control information. At step 505, the UE 204 receives the RRC message from the BS 202 to enter the second RRC state from the first RRC state. In an example, the RRC message includes the RRC release message to enter the RRC Idle state from the first RRC state. In another example, the RRC message includes the RRC release message with suspend configurations to enter the RRC Inactive state from the first RRC state.

At step 506, the UE 204 enters the second RRC state from the first RRC state, based on the RRC message received from the BS 202 and retains the MBS bearer established with the BS 202. At step 507, the UE 204 continues the reception of the ongoing one or more MBS services from the BS 202 using the established MBS bearer. Thus, an ongoing MBS session is continued on the UE 204.

Figure 6:
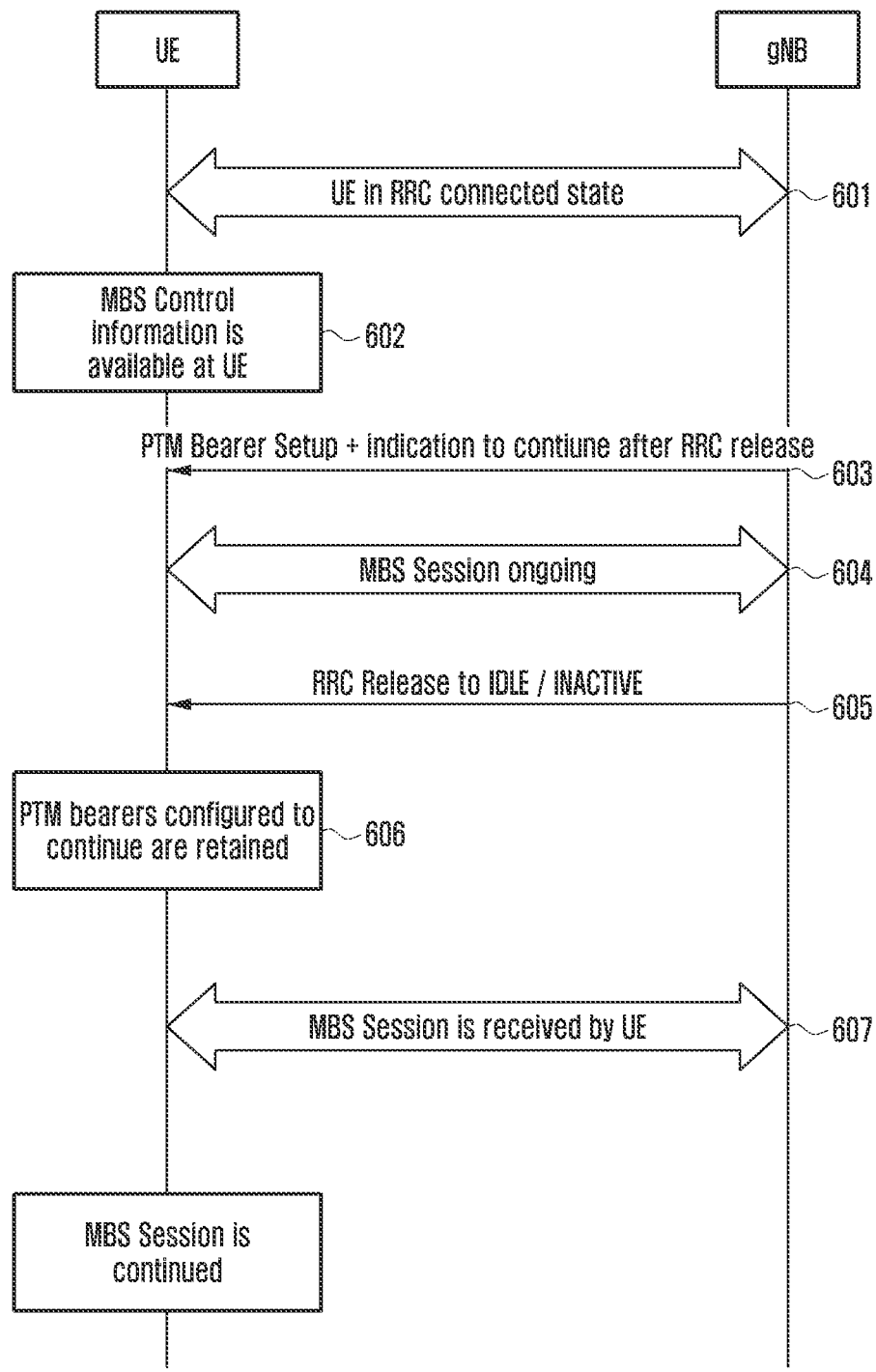
FIG. 6 is a sequence diagram depicting an example scenario of indicating to the UE, an MBS bearer allowed to be used for continuing the reception of the ongoing one or more MBS services upon entering the second RRC state from the first RRC state, according to embodiments as disclosed herein.

FIG. 6 is a sequence diagram depicting an example scenario of indicating the MBS bearer allowed to be used for continuing the reception of the ongoing one or more MBS services on the UE 204 entering the second RRC state from the first RRC state, according to embodiments as disclosed herein.

At step 601, the UE 204 starts operating in the first state/RRC Connected state. At step 602, the UE 204 receives the MBS control information/first message corresponding to the one or more MBS services from the BS 202. At step 603, the UE 204 establishes the MBS bearer with the BS 202 and receives the bearer setup message from the BS 202 indicating the MBS bearer allowed to be used for continuing the reception of the MBS services on releasing the RRC resources with the BS 202.

At step 604, the UE 204 in the first RRC state starts receiving the one or more MBS services from the BS 202 based on the received MBS control information. At step 605, the UE 204 receives the RRC message from the BS 202 to enter the second RRC state from the first RRC state.

At step 606, the UE 204 enters the second RRC state from the first RRC state, based on the RRC message received from the BS 202 and retains the allowed MBS bearer, which has been indicated by the BS 202 (at step 603). At step 607, the UE 204 continues the reception of the ongoing one or more MBS services from the BS 202 using the allowed MBS bearer.

Figure 7:
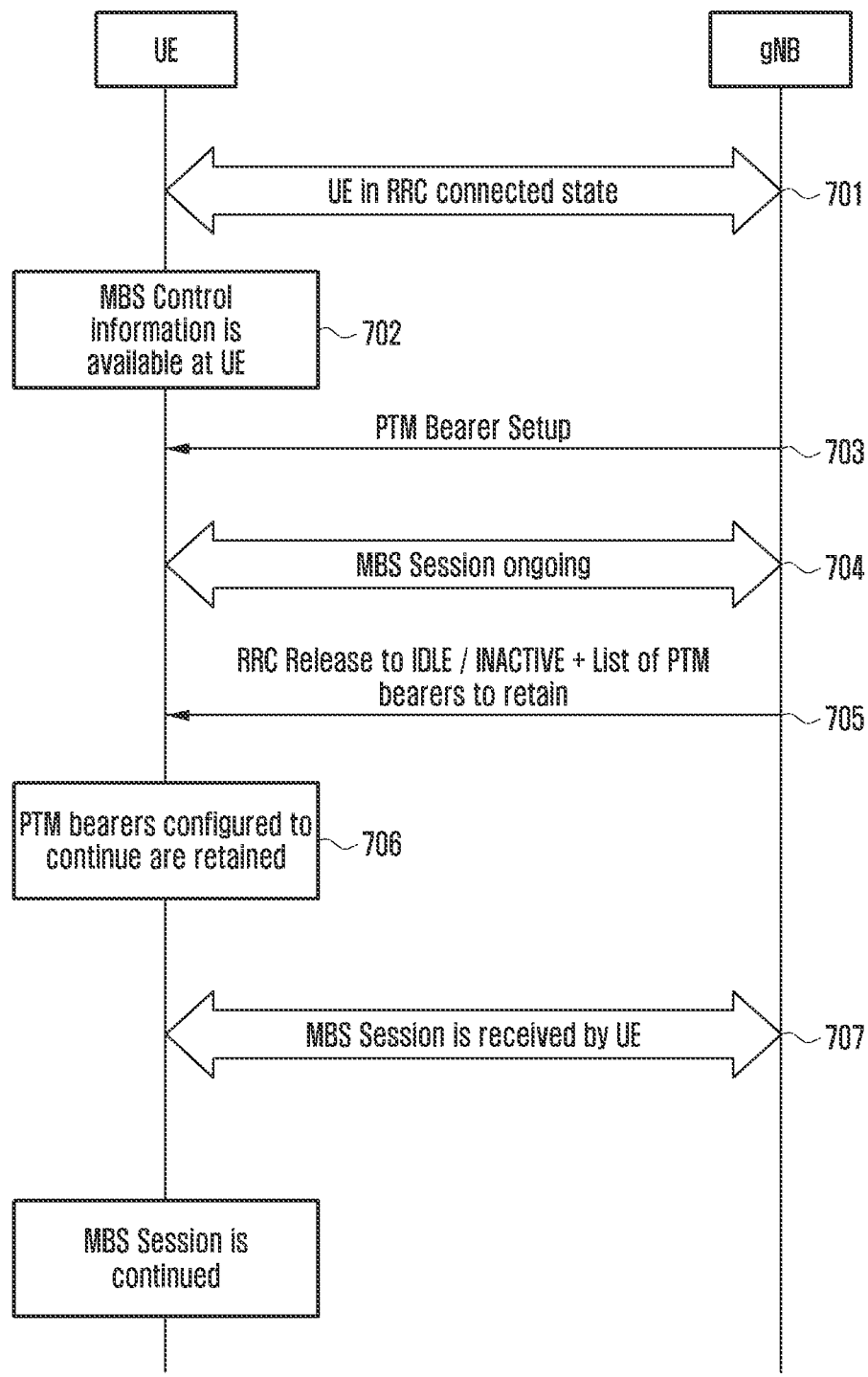
FIG. 7 is a sequence diagram depicting an example scenario of indicating to the UE, a list of MBS bearers allowed to be used for continuing the reception of the ongoing one or more MBS services upon entering the second RRC state from the first RRC state, according to embodiments as disclosed herein.

FIG. 7 is a sequence diagram depicting an example scenario of indicating the list of MBS bearers allowed to be used for continuing the reception of the ongoing one or more MBS services on the UE 204 entering the second RRC state from the first RRC state, according to embodiments as disclosed herein.

At step 701, the UE 204 starts operating in the first state/RRC Connected state. At step 702, the UE 204 receives the MBS control information/first message corresponding to the one or more MBS services from the BS 202. At step 703, the UE 204 in the first RRC state, establishes the MBS bearer with the BS 202.

At step 704, the UE 204 in the first RRC state starts receiving the one or more MBS services from the BS 202 based on the received MBS control information. At step 705, the UE 204 receives the RRC message from the BS 202 to enter the second RRC state from the first RRC state. The RRC message also indicates the list of MBS bearers allowed to be used for continuing the reception of the ongoing one or more MBS services upon entering the second RRC state from the first RRC state. In an example, the RRC message includes the RRC release message with the allowed list of MBS bearers. In another example, the RRC message includes the RRC release message with suspend configurations and the allowed list of MBS bearers.

At step 706, the UE 204 enters the second RRC state from the first RRC state, based on the RRC message received from the BS 202 and retains the allowed list of MBS bearers, which has been signalled by the BS 202 (at step 705). At step 707, the UE 204 continues the reception of the ongoing one or more MBS services from the BS 202 using the list of MBS bearers.

Figure 8:
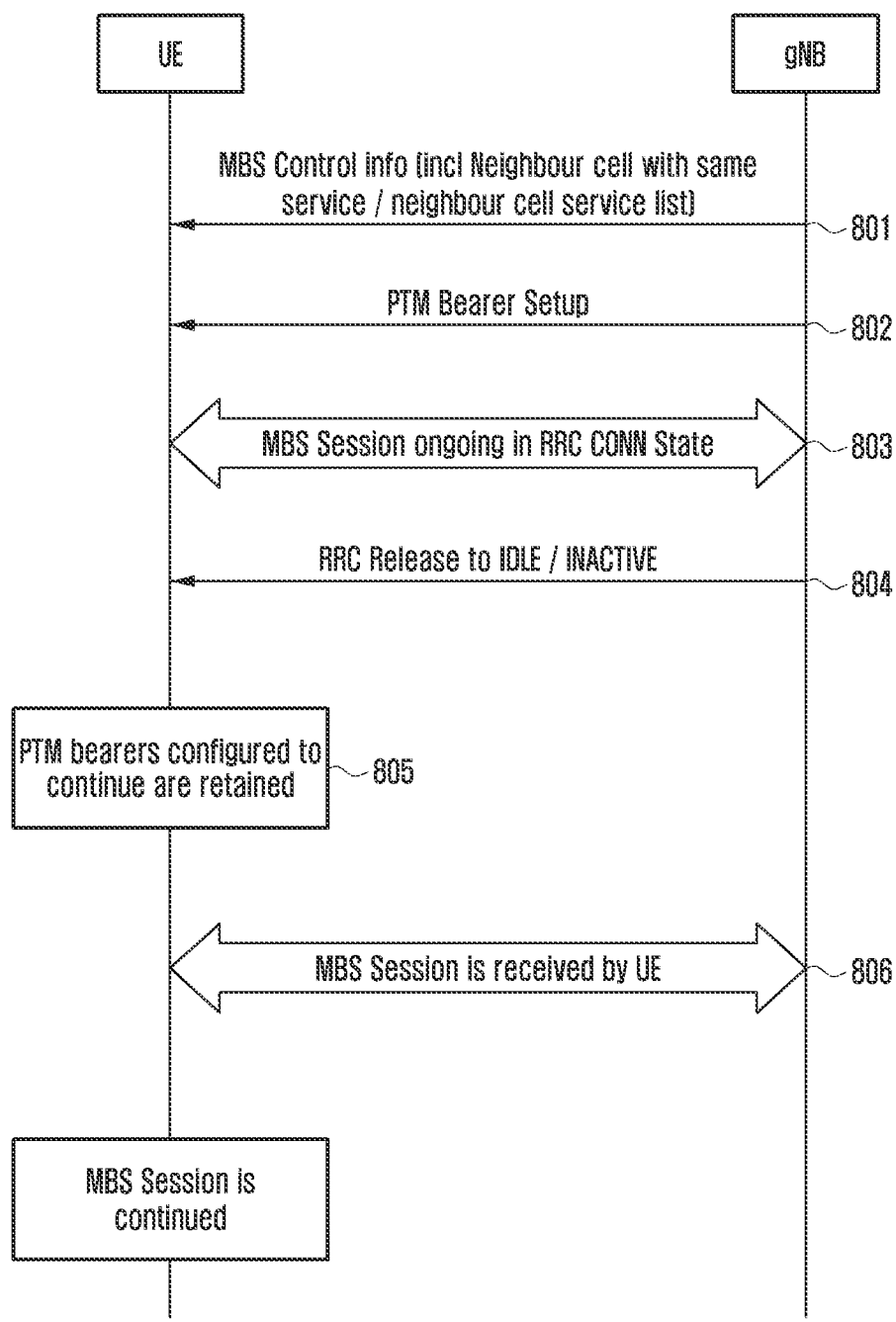
FIG. 8 is a sequence diagram depicting an example scenario of indicating the MBS bearer and neighbor cell information to the UE in MBS control information, for continuing the reception of the ongoing one or more MBS services upon entering the second RRC state from the first RRC state, according to embodiments as disclosed herein.

FIG. 8 is a sequence diagram depicting an example scenario of indicating the MBS bearer and the neighbor cell information to the UE 204 for continuing the reception of the ongoing one or more MBS services upon entering the second RRC state from the first RRC state, according to embodiments as disclosed herein.

At step 801, the UE 204 (in the first RRC state) receives the MBS control information corresponding to the one or more MBS services from the BS 202. The MBS control information includes the neighbor cell information. The neighbor cell information includes the one or more neighbor cells supporting the one or more MBS services or the list of neighbor cell supported MBS services.

At step 802, the UE 204 in the first RRC state, establishes the MBS bearer with the BS 202.

At step 803, the UE 204 in the first RRC state starts receiving the one or more MBS services from the BS 202 based on the received MBS control information. At step 804, the UE 204 receives the RRC message from the BS 202 to enter the second RRC state from the first RRC state.

At step 805, the UE 204 enters the second RRC state from the first RRC state, based on the RRC message received from the BS 202 and retains the MBS bearer established with the BS 202. At step 806, the UE 204 continues the reception of the ongoing one or more MBS services using the MBS bearer and the neighbor cell information. In an example, the UE 204 being camped on the serving cell/BS 202, continues the reception of the ongoing one or more MBS services or the new one or more MBS services from the indicated one or more neighbor cells using the established MBS bearer. In another example, the UE 204 reselects the neighbor cell from the indicated one or more neighbor cells and receives the ongoing one or more MBS services or the new one or more MBS services from the reselected neighbor cell using the established MBS bearer. The new MBS services are the MBS services supported by the one or more neighbor cells.

Figure 9:
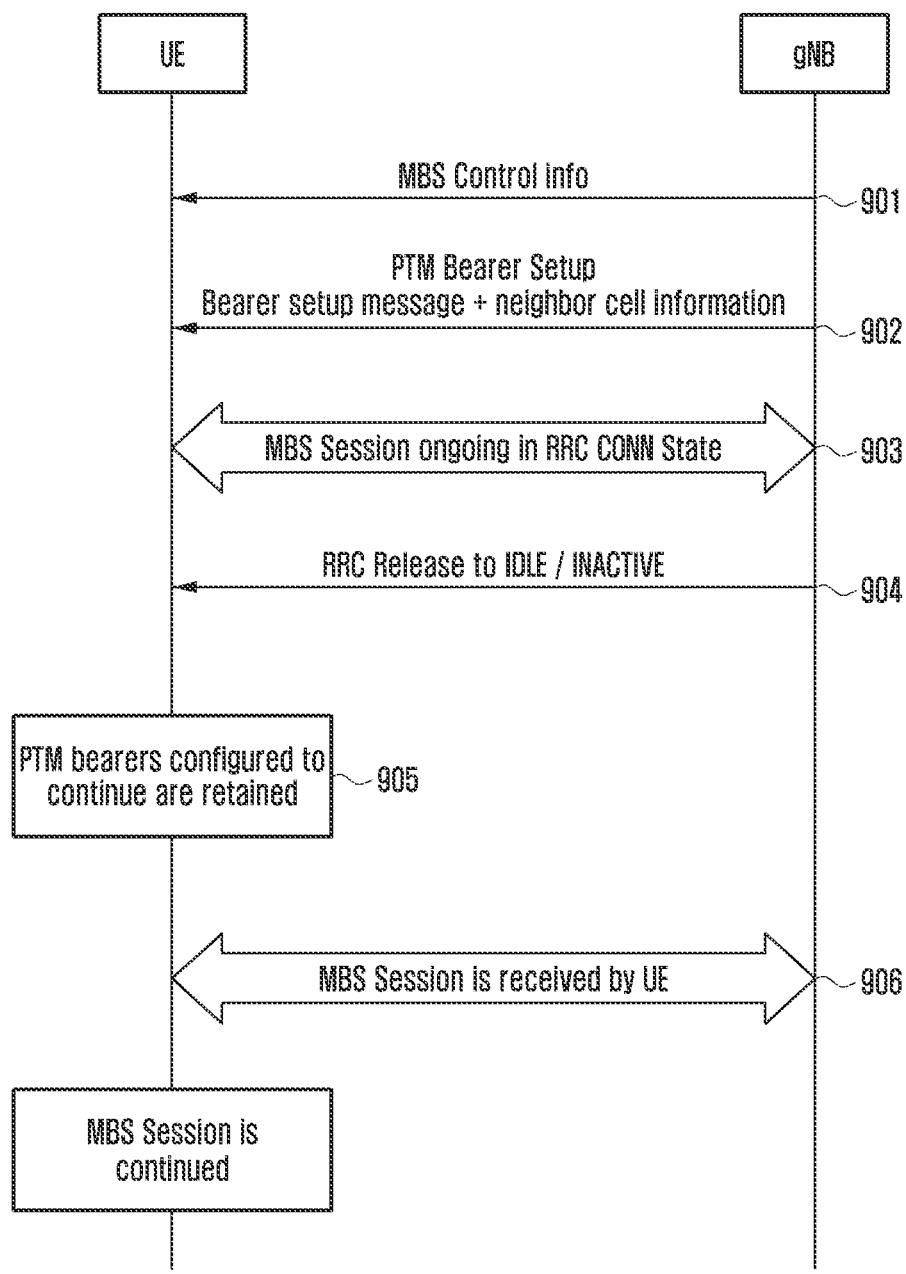
FIG. 9 is a sequence diagram depicting an example scenario of indicating the MBS bearer and neighbor cell information to the UE in a bearer setup message, for continuing the reception of the ongoing one or more MBS services upon entering the second RRC state from the first RRC state, according to embodiments as disclosed herein.

FIG. 9 is a sequence diagram depicting an example scenario of indicating the MBS bearer and neighbor cell information to the UE in the bearer setup message, for continuing the reception of the ongoing one or more MBS services upon entering the second RRC state from the first RRC state, according to embodiments as disclosed herein.

At step 901, the UE 204 receives the MBS control information/first message corresponding to the one or more MBS services from the BS 202, while operating in the first RRC state. At step 902, the UE 204 establishes the MBS bearer with the BS 202 and receives the bearer setup message from the BS 202 indicating the MBS bearer allowed to be used for continuing the reception of the MBS services on releasing the RRC resources with the BS 202 and the neighbor cell information. The neighbor cell information includes the one or more neighbor cells supporting the one or more MBS services or the list of neighbor cell supported MBS services.

At step 903, the UE 204 in the first RRC state starts receiving the one or more MBS services from the BS 202 based on the received MBS control information. At step 904, the UE 204 receives the RRC message from the BS 202 to enter the second RRC state from the first RRC state.

At step 905, the UE 204 enters the second RRC state from the first RRC state, based on the RRC message received from the BS 202 and retains the allowed MBS bearer, which has been indicated by the BS 202 (at step 902). At step 906, the UE 204 continues the reception of the ongoing one or more MBS services using the MBS bearer and the neighbor cell information.

Figure 10:
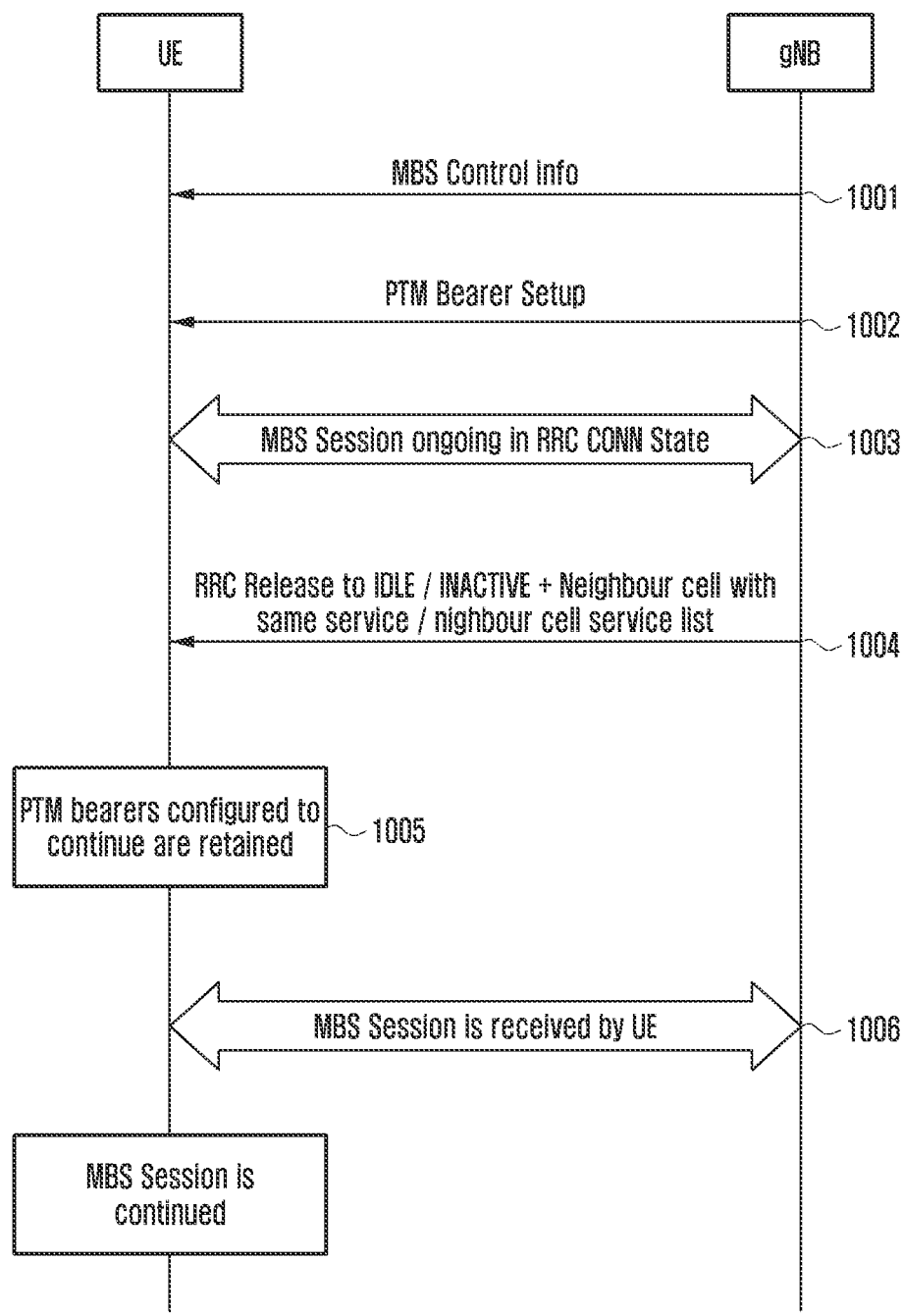
FIG. 10 is a sequence diagram depicting another example scenario of indicating the MBS bearer and the neighbor cell information to the UE in an RRC message, for continuing the reception of the ongoing one or more MBS services upon entering the second RRC state from the first RRC state, according to embodiments as disclosed herein.

FIG. 10 is a sequence diagram depicting another example scenario of indicating the MBS bearer and the neighbor cell information to the UE 204 for continuing the reception of the ongoing one or more MBS services upon entering the second RRC state from the first RRC state, according to embodiments as disclosed herein.

At step 1001, the UE 204 (in the first RRC state) receives the MBS control information corresponding to the one or more MBS services from the BS 202. At step 1002, the UE 204 in the first RRC state, establishes the MBS bearer with the BS 202. At step 1003, the UE 204 in the first RRC state starts receiving the one or more MBS services from the BS 202 based on the received MBS control information.

At step 1004, the UE 204 receives the RRC message from the BS 202 to enter the second RRC state from the first RRC state. The RRC message includes the neighbor cell information. The neighbor cell information includes the one or more neighbor cells supporting the one or more MBS services or the list of neighbor cell supported MBS services.

At step 1005, the UE 204 enters the second RRC state from the first RRC state, based on the RRC message received from the BS 202 and retains the MBS bearer established with the BS 202. At step 1006, the UE 204 continues the reception of the ongoing one or more MBS services using the MBS bearer and the neighbor cell information.

Figure 11:
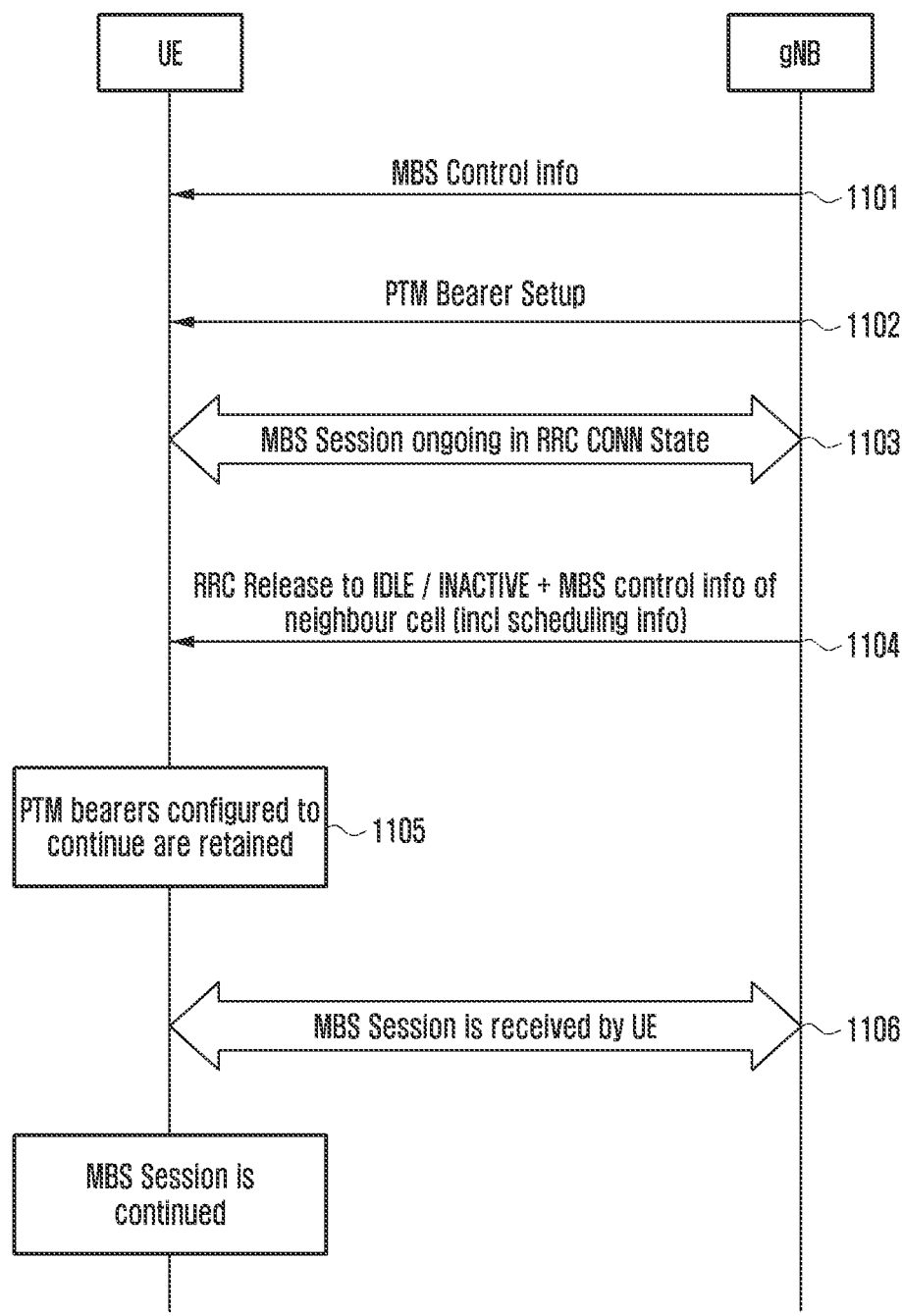
FIG. 11 is a sequence diagram depicting another example scenario of indicating scheduling and timing information, and the MBS control information to the UE in the RRC message for continuing the reception of the ongoing one or more MBS services upon entering the second RRC state from the first RRC state, according to embodiments as disclosed herein.

FIG. 11 is a sequence diagram depicting another example scenario of indicating the scheduling and timing information, and the MBS control information to the UE 204 for continuing the reception of the ongoing one or more MBS services upon entering the second RRC state from the first RRC state, according to embodiments as disclosed herein.

At step 1101, the UE 204 (in the first RRC state) receives the MBS control information corresponding to the one or more MBS services from the BS 202. At step 1102, the UE 204 in the first RRC state, establishes the MBS bearer with the BS 202. At step 1103, the UE 204 in the first RRC state starts receiving the one or more MBS services from the BS 202 based on the received MBS control information.

At step 1104, the UE 204 receives the RRC message from the BS 202 to enter the second RRC state from the first RRC state. The RRC message includes the signaling information such as, but are not limited to, the one or more neighbor cells supporting the one or more MBS services, the list of neighbor cell supported MBS services, the scheduling and timing information of the neighbor cell supported MBS services (for example, frame/sub-frame/slot/offset or the like.), the MBS control information corresponding to the neighbor cell supported MBS services, and so on.

At step 1105, the UE 204 enters the second RRC state from the first RRC state, based on the RRC message received from the BS 202 and retains the MBS bearer established with the BS 202. At step 1106, the UE 204 continues the reception of the ongoing one or more MBS services using the MBS bearer and the signaling information present in the RRC message.

Figure 12:
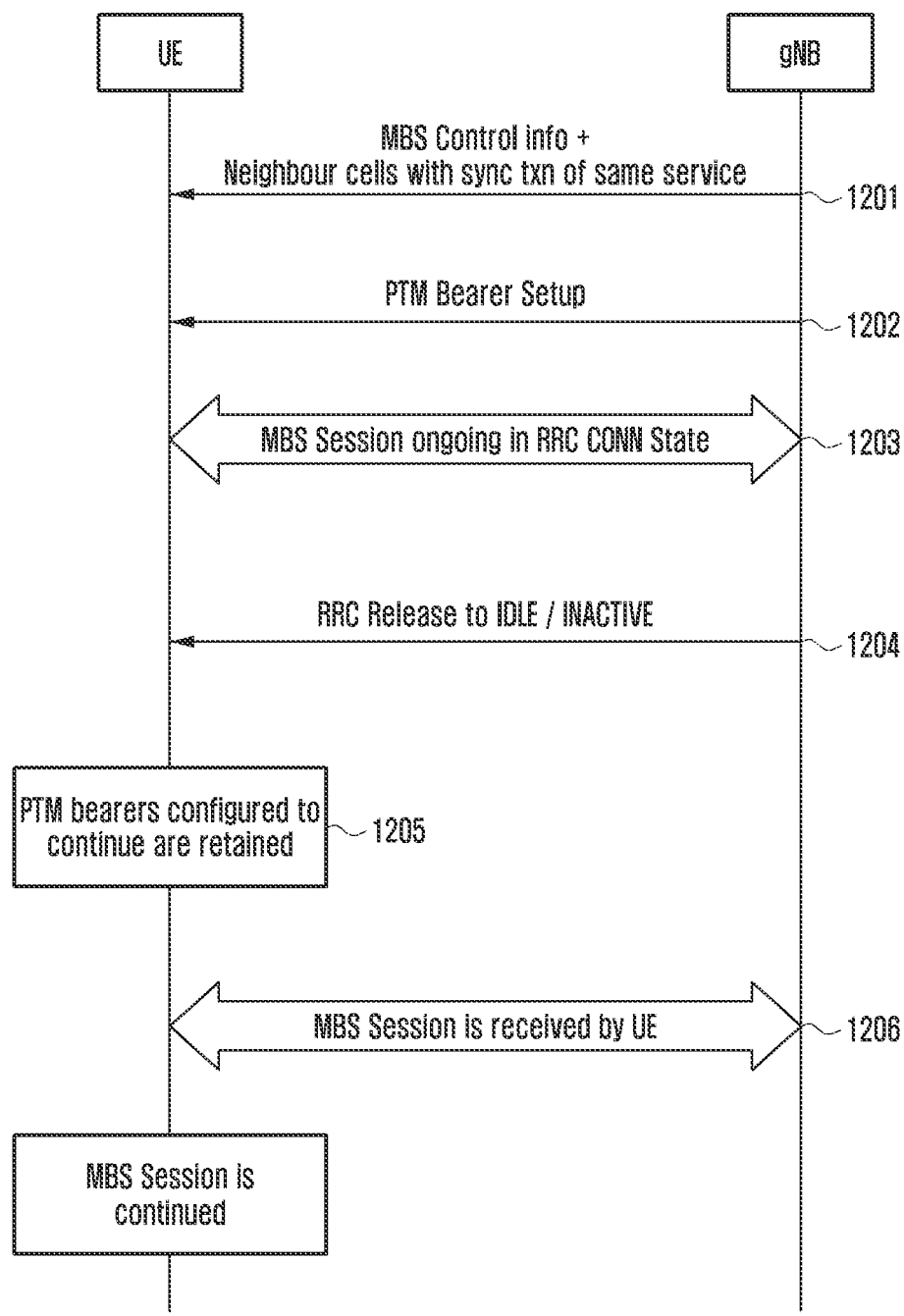
FIG. 12 is a sequence diagram depicting an example scenario of indicating the neighbor cell information to the UE in the MBS control information for continuing the reception of the one or more MBS services, upon entering the second RRC state from the first RRC state, according to embodiments as disclosed herein.

FIG. 12 is a sequence diagram depicting an example scenario of indicating the neighbor cell information to the UE 204 to continue the reception of the one or more MBS services, upon entering the second RRC state from the first RRC state, according to embodiments as disclosed herein.

At step 1201, the UE 204 (in the first RRC state) receives the MBS control information including the neighbor cell information from the BS 202. The neighbor cell information indicates whether the transmission of the one or more MBS services on the at least one neighbor cell is synchronized or not synchronized with the one or more MBS services being transmitting on the serving cell/BS 202. The neighbor cell information may also include SFN information for the neighbor cells, which indicates whether the neighbor cells belong to the SFN network or not.

At step 1202, the UE 204 in the first RRC state, establishes the MBS bearer with the BS 202. At step 1203, the UE 204 in the first RRC state starts receiving the one or more MBS services from the BS 202 based on the received MBS control information.

At step 1204, the UE 204 receives the RRC message from the BS 202 to enter the second RRC state from the first RRC state. At step 1205, the UE 204 enters the second RRC state from the first RRC state, based on the RRC message received from the BS 202 and retains the MBS bearer established with the BS 202. At step 1206, the UE 204 continues the reception of the ongoing one or more MBS services using the MBS bearer and the neighbor cell information received from the BS 202 in the MBS control information.

Figure 13:
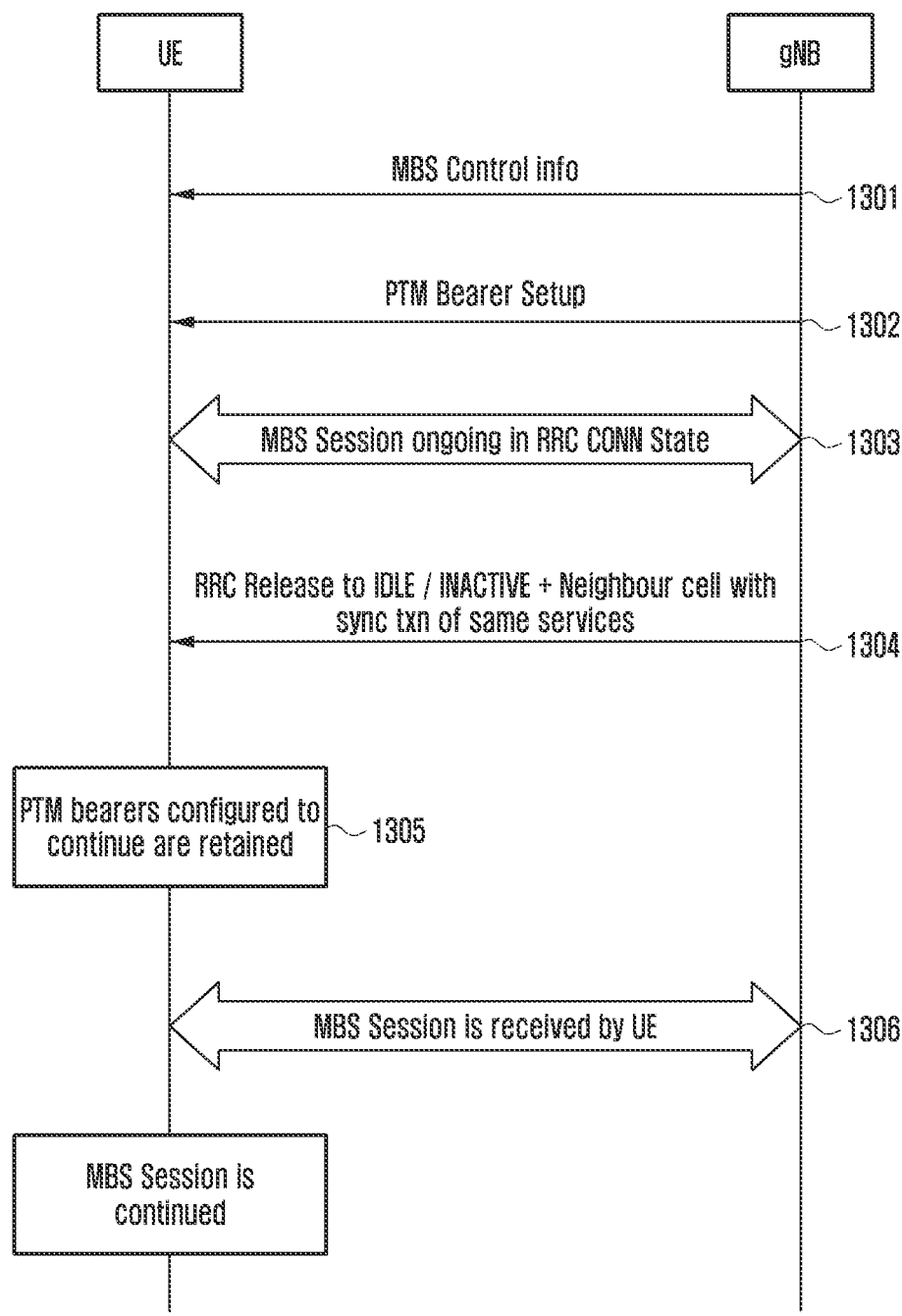
FIG. 13 is a sequence diagram depicting another example scenario of indicating the neighbor cell information to the UE in the RRC message for continuing the reception of the one or more MBS services, upon entering the second RRC state from the first RRC state, according to embodiments as disclosed herein.

FIG. 13 is a sequence diagram depicting another example scenario of indicating the neighbor cell information to the UE 204 to continue the reception of the one or more MBS services, upon entering the second RRC state from the first RRC state, according to embodiments as disclosed herein.

At step 1301, the UE 204 (in the first RRC state) receives the MBS control information corresponding to the one or more MBS services from the BS 202.

At step 1302, the UE 204 in the first RRC state, establishes the MBS bearer with the BS 202. At step 1303, the UE 204 in the first RRC state starts receiving the one or more MBS services from the BS 202 based on the received MBS control information.

At step 1304, the UE 204 receives the RRC message from the BS 202 to enter the second RRC state from the first RRC state. The RRC message includes the neighbor cell information. The neighbor cell information indicates whether the transmission of the one or more MBS services on the at least one neighbor cell is synchronized or not synchronized with the one or more MBS services being transmitting on the serving cell/BS 202. The neighbor cell information may also include the SFN information for the neighbor cells, which indicates whether the neighbor cells belong to the SFN network or not.

At step 1305, the UE 204 enters the second RRC state from the first RRC state, based on the RRC message received from the BS 202 and retains the MBS bearer established with the BS 202. At step 1306, the UE 204 continues the reception of the ongoing one or more MBS services using the MBS bearer and the neighbor cell information received from the BS 202 in the RRC message.

Embodiments herein disclose methods and systems to achieve inter RRC state and inter cell service continuity in NR MBS by addressing procedures and signalling for achieving service continuity upon state change and upon cell change in scenarios such as, but not limited to, an RRC connection release, an RRC cell reselection, and so on.

The embodiments disclosed herein can be implemented through at least one software program running on at least one hardware device and performing network management functions to control the elements. The elements shown in FIGS. 2-4 can be at least one of a hardware device, or a combination of hardware device and software module.

The embodiments disclosed herein describe methods and systems for managing Multicast and Broadcast Service (MBS) service continuity for a User Equipment (UE). Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the disclosure may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

The invention claimed is:
1. A method performed by a terminal in a wireless communication system, the method comprising:
receiving, from a cell, multicast and broadcast service (MBS) control information;

based on the MBS control information, receiving, from the cell, at least one MBS service via an MBS bearer being associated with the at least one MBS service;

receiving, from the cell, a radio resource control (RRC) release message with suspend configuration;

based on the RRC release message, suspending at least one radio bearer (RB) except for the MBS bearer and entering an RRC inactive state; and receiving, via the MBS bearer from at least one neighboring cell, the at least one MBS service, while the terminal is in the RRC inactive state, wherein the RRC release message includes information on the at least one neighboring cell for receiving the at least one MBS service, while the terminal is in the RRC inactive state.

2. The method of claim 1, wherein the MBS bearer comprises a point-to-multipoint (PTM) bearer.

3. The method of claim 1, wherein the RRC release message further comprises a list of MBS bearers for receiving the at least one MBS service in case that the terminal is in the RRC inactive state.

4. The method of claim 1, wherein the at least one MBS service is received based on the information on the at least one neighboring cell included in the RRC release message.

5. The method of claim 4, wherein the information on the at least one neighboring cell comprises information on at least one neighboring cell for providing the ongoing at least one MBS service.

6. A terminal in a wireless communication system, the terminal comprising:
  a transceiver; and
  at least one processor configured to:
    receive, from a cell via the transceiver, multicast and broadcast service (MBS) control information,
    based on the MBS control information, receive, from the cell via the transceiver, at least one MBS service via an MBS bearer being associated with at least one MBS service,
    receive, from the cell via the transceiver, a radio resource control (RRC) release message with suspend configuration,
    based on the RRC release message, suspend at least one radio bearer (RB) except for the MBS bearer and entering an RRC inactive state, and
    receive, via the MBS bearer from at least one neighboring cell via the transceiver, the at least one MBS service, while the terminal is in the RRC inactive state, wherein the RRC release message includes information on the at least one neighboring cell for receiving the at least one MBS service, while the terminal is in the RRC inactive state.

7. The terminal of claim 6,
wherein the MBS bearer comprises a point-to-multipoint (PTM) bearer.

8. The terminal of claim 6, wherein the RRC release message further comprises a list of MBS bearers for receiving the at least one MBS service in case that the terminal is in the RRC inactive state.

9. The terminal of claim 6, wherein the at least one MBS service is received based on the information on the at least one neighboring cell included in the RRC release message.

10. The terminal of claim 9, wherein the information on the at least one neighboring cell comprises information on at least one neighboring cell for providing the ongoing at least one MBS service.

* * * * *